United States Patent
Della Porta

(10) Patent No.: US 9,457,987 B2
(45) Date of Patent: Oct. 4, 2016

(54) STOP SEQUENCING FOR BRAKING DEVICE

(75) Inventor: Joseph L. Della Porta, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 568 days.

(21) Appl. No.: 13/983,234

(22) PCT Filed: Feb. 4, 2011

(86) PCT No.: PCT/US2011/023769
§ 371 (c)(1),
(2), (4) Date: Aug. 1, 2013

(87) PCT Pub. No.: WO2012/105986
PCT Pub. Date: Aug. 9, 2012

(65) Prior Publication Data
US 2013/0313052 A1    Nov. 28, 2013

(51) Int. Cl.
*B66B 1/32* (2006.01)
*B66B 5/02* (2006.01)
*F16D 63/00* (2006.01)

(52) U.S. Cl.
CPC . *B66B 1/32* (2013.01); *B66B 5/02* (2013.01); *F16D 63/002* (2013.01)

(58) Field of Classification Search
CPC .......... B66B 1/32; B66B 5/02; F16D 63/002
USPC ........ 187/247, 277, 286–289, 305, 391, 393
See application file for complete search history.

(56) References Cited

U.S. PATENT DOCUMENTS

| | | | | |
|---|---|---|---|---|
| 4,116,306 A | * | 9/1978 | Alley | B66B 1/308 187/288 |
| 4,974,703 A | * | 12/1990 | Nomura | B66B 1/32 187/288 |
| 5,070,290 A | | 12/1991 | Iwasa et al. | |

(Continued)

FOREIGN PATENT DOCUMENTS

| CN | 100526190 C | 8/2009 |
|---|---|---|
| CN | 101903276 A | 12/2010 |

(Continued)

OTHER PUBLICATIONS

International Search Report and Written Opinion for related International Application No. PCT/US11/23769; report dated Nov. 28, 2011.

(Continued)

*Primary Examiner* — Anthony Salata
(74) *Attorney, Agent, or Firm* — Cantor Colburn LLP

(57) ABSTRACT

An elevator system including a braking system, and a method of retrofitting an elevator for such braking system is disclosed. The braking system may comprise a first brake having a first magnetic brake coil, the first brake movable between a disengaged and an engaged position, a second brake having a second magnetic brake coil, the second brake movable between a disengaged and an engaged position, and a brake control device having a brake power source. The brake control device may be electrically connected to the first and second brakes and may be configured to selectively delay or sequence the movement of the first brake and the second brake to the engaged position with residual current from the brake coils.

23 Claims, 4 Drawing Sheets

(56) References Cited

U.S. PATENT DOCUMENTS

| | | | | |
|---|---|---|---|---|
| 5,327,055 A * | 7/1994 | Danielson | H02P 3/04 | 318/366 |
| 5,821,476 A | 10/1998 | Hakala et al. | | |
| 5,893,432 A | 4/1999 | Nguyen et al. | | |
| 6,802,395 B1 * | 10/2004 | Helstrom | B66B 5/02 | 187/247 |
| 7,669,697 B2 * | 3/2010 | Ueda | B66B 5/02 | 187/292 |
| 7,730,998 B2 * | 6/2010 | Takahashi | B66B 1/32 | 187/287 |
| 7,775,330 B2 * | 8/2010 | Kattainen | B66B 5/04 | 187/287 |
| 7,891,466 B2 * | 2/2011 | Okamoto | B66B 5/02 | 187/287 |
| 7,896,139 B2 * | 3/2011 | Syrman | B66B 5/18 | 187/288 |
| 8,365,873 B2 * | 2/2013 | Viita-Aho | B66B 5/02 | 187/314 |
| 2007/0272500 A1 | 11/2007 | Gremaud et al. | | |
| 2009/0255764 A1 | 10/2009 | Ueda et al. | | |
| 2010/0236870 A1 | 9/2010 | Kostka | | |
| 2013/0043097 A1 * | 2/2013 | Widmer | B66B 5/02 | 187/288 |
| 2013/0213745 A1 * | 8/2013 | Kattainen | H02P 3/02 | 187/288 |

FOREIGN PATENT DOCUMENTS

| | | | |
|---|---|---|---|
| CN | 101903279 A | 12/2010 | |
| EP | 0245686 B1 | 4/1987 | |
| EP | 1997764 A1 | 12/2008 | |
| EP | 2020395 A1 | 2/2009 | |
| EP | 2147883 A1 | 1/2010 | |
| JP | H-04286587 A | 10/1992 | |
| JP | H05201678 A | 8/1993 | |
| JP | H06286950 A | 10/1994 | |
| JP | H07101645 A | 4/1995 | |
| JP | H07157211 A | 6/1995 | |
| JP | 2001-146366 A | 5/2001 | |
| JP | 2001278572 A | 10/2001 | |
| JP | 2007/046129 | 2/2007 | |
| JP | 2008/090601 | 4/2008 | |
| JP | 2008-120469 | 5/2008 | |
| JP | 2009091089 A | 4/2009 | |
| WO | WO-2007/108068 A1 | 9/2007 | |
| WO | WO-2007/108069 A1 | 9/2007 | |
| WO | WO-2008/012896 A1 | 1/2008 | |
| WO | WO-2008/142790 A1 | 11/2008 | |
| WO | WO-2009/154591 A1 | 12/2009 | |
| WO | WO-2010/009746 A1 | 1/2010 | |
| WO | WO 2010/125689 | 4/2010 | |

OTHER PUBLICATIONS

Chinese Office Action, Application No. 2011-80066730.6 dated on Mar. 18, 2014.

Japanese Office Action, Application No. 2013-552508 dated on Sep. 10, 2014.

Japanese Office Action for application JP 2013-552508, dated Jun. 16, 2015, 3 pages.

* cited by examiner

STOP SEQUENCING FOR BRAKING DEVICE

CROSS-REFERENCE TO RELATED APPLICATIONS

This application is a U.S. national stage filing under 35 USC §371 of International Patent Application No. PCT/US11/23769, filed on Feb. 4, 2011.

FIELD OF THE DISCLOSURE

The present disclosure generally relates to braking devices, and, in particular, relates to a braking device for use with elevators.

BACKGROUND OF THE DISCLOSURE

In modern society, elevators have become ubiquitous machines for transporting people and cargo through buildings of multiple stories. As elevators are operated continually throughout the day making frequent stops at various floor levels, the braking system of an elevator plays an important role in the smooth operation of the elevator.

Traction machines such as those used in elevator systems to raise and lower the elevator car utilizing belt-driven or rope driven systems typically employ a mechanical or electromechanical braking system to stop or temporarily hold a particular motion. Electromechanical brakes of elevators, for instance, generally employ a clutch-type braking mechanism for supplying a holding or braking torque that is sufficient for slowing or holding an elevator car at a fixed position. The braking torque supplied by clutch-type brakes may be mechanically produced by the friction that is generated between a rotating brake disk that is rigidly attached to a machine shaft and a set of friction pads that is releasably placed in contact with a surface of the brake disk. The engagement or disengagement of the friction pads is electromechanically controlled by a brake coil. When the brake coil is activated, a magnetic attraction between the armature plates and an electromagnetic core causes the friction pads to disengage from the surface of the brake disk. When the brake coil is deactivated, springs that engage the armature plates urge the armature plates into engagement with the surface of the brake disk. Although such clutch-type brakes have been proven to be effective and are still widely used today in various traction applications such as elevators, and the like, they still have room for improvement.

For instance, a clutch-type brake cannot selectively apply different amounts of force to stop the elevator depending on the type of stop required (e.g. an emergency stop vs. a normal stop). A typical clutch-type brake is limited to its rated torque which is further dictated by the mechanical limits of the brake, material composition of its friction pads, and the like. During an emergency, such as loss of power to the building, the braking system must stop the elevator quickly. Such an emergency stop is often abrupt and causes the elevator car to stop with a jerk, which can be an uncomfortable experience for passengers traveling within the elevator car. Since an elevator braking system provides the same braking torque for a normal stop that it provides for an emergency stop, the elevator car and the passengers within it may experience a jerk every time the braking system is engaged to stop the elevator for an emergency stop. Accordingly, it follows that clutch-type brakes do not offer control or variation of the braking force engaged to stop the elevator.

In light of the foregoing, improvements continue to be sought for providing an effective braking system to safely stop an elevator while maximizing the comfort of the stop for the passengers.

SUMMARY OF THE DISCLOSURE

In accordance with one aspect of the disclosure, an elevator system is disclosed. The elevator system may comprise a car, a first brake having a first magnetic brake coil, and a brake control device having a brake power source. The first brake may be movable between a disengaged and an engaged position. The brake control device may be electrically connected to the first brake and may be configured to selectively delay the movement of the first brake to the engaged position with a first residual current from the first brake coil. The first brake may be configured to be moveable to the disengaged position upon the first brake coil being energized by the brake power source and may be configured to be moveable to the engaged position upon the first brake coil being de-energized. The first residual current may delay the movement of the first brake to the engaged position by slowing the rate of decay of stored energy within the first brake coil. In an embodiment, the delay may be in the range of about 150 to about 600 milliseconds. In some embodiments, movement of the first brake to the engaged position may be delayed in response to unintended movement of the elevator car.

The elevator system may, in some embodiments, further comprise a second brake having a second magnetic brake coil. The second brake may be electrically connected to the brake control device and may be movable between a disengaged and an engaged position. The second brake may have a second magnetic brake coil. The second brake may be movable from an engaged position to a disengaged position upon the second brake coil being energized by the brake power source. The second brake may be configured to be moveable to the engaged position upon the second brake coil being de-energized. In an embodiment, the brake control device may be configured to selectively delay the movement of the second brake to the engaged position with a second residual current from the second brake coil.

In accordance with another aspect of the disclosure, the elevator system may comprise a safety chain including a governor switch movable between an open and a closed position. The safety chain may be electrically connected to the brake control device. In an embodiment, movement of the second brake to the engaged position may be delayed in response to the governor switch transitioning to the open position. An elevator power source may be connected to the safety chain, wherein movement of the first brake may be delayed in response to a loss of power from the elevator power source to the safety chain.

In accordance with another aspect of the disclosure, a braking device for an elevator is disclosed. The brake system may comprise a first brake having a first magnetic brake coil and configured to be movable between a disengaged and an engaged position, and a brake control device for selectively delaying the movement of the first brake to the engaged position with residual current from the first brake coil, the brake control device electrically connected to the first brake.

In an alternative embodiment, the brake system may comprise a second brake having a second magnetic brake coil and configured to be movable between a disengaged and an engaged position, wherein the brake control device may selectively delay the movement of the second brake to the engaged position with residual current from the second brake coil, the brake control device electrically connected to the second brake.

In an embodiment, the brake control device may delay movement of the first brake in response to unintended movement of an elevator car, and/or a loss of power from an elevator power source. In an embodiment, including the second brake, the brake control device may delay movement of the second brake in response to an overspeed event. In an embodiment, such delays may be in the range of about 150 to about 600 milliseconds.

In accordance with yet another aspect of the disclosure, a method of retrofitting is disclosed for an elevator system having a car, a first brake having a first magnetic brake coil, and a brake control device. The method may comprise modifying the brake control device to selectively delay the activation of the first brake by controlling the rate of decay of stored energy within the first magnetic brake coil. The rate of decay may be controlled by recirculating through the first magnetic brake coil residual current. In an embodiment, such delay may be in the range of about 150 to about 600 milliseconds.

In an alternative embodiment, the method may further comprise modifying the brake control device to selectively delay the activation of the second brake by controlling the rate of decay of stored energy within the second magnetic brake coil. The rate of decay of stored energy within the second magnetic brake coil may be controlled by recirculating through the second magnetic brake coil residual current. In an embodiment, such delay may be in the range of about 150 to about 600 milliseconds.

In an embodiment, the elevator system further includes a safety chain having a governor switch movable between a closed position and an open position. The first brake may be activated before the second brake when the elevator car experiences an unintended movement and the second brake may be activated before the first brake when the governor transitions to the open position.

These and other aspects of this disclosure will become more readily apparent upon reading the following detailed description when taken in conjunction with the accompanying drawings.

Figure 1:
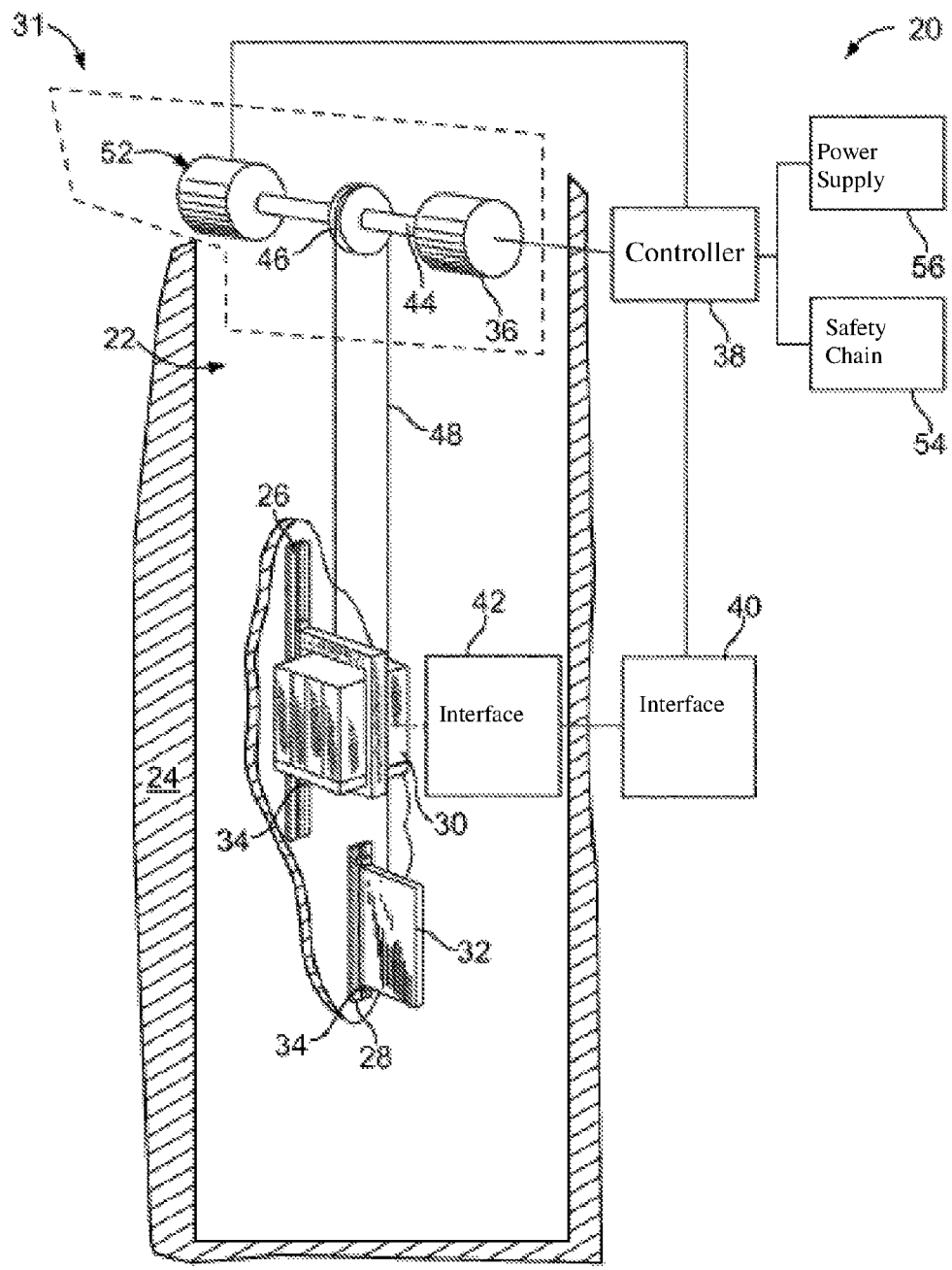
FIG. 1 is an exemplary elevator system that could use a brake control system constructed in accordance with the teachings of this disclosure.

While the present disclosure is susceptible to various modifications and alternative constructions, certain illustrative embodiments thereof have been shown in the drawings and will be described below in detail. It should be understood, however, that there is no intention to be limited to the specific forms disclosed, but on the contrary, the intention is to cover all modifications, alternative constructions, and equivalents falling within the spirit and scope of the present disclosure.

DETAILED DESCRIPTION OF THE DISCLOSURE

Referring now to FIG. 1, an exemplary elevator system 20 is shown in schematic fashion. It is to be understood that the version of the elevator system 20 shown in FIG. 1 is for illustrative purposes only and to present background for the various components of a general elevator system.

As shown in FIG. 1, the elevator system 20 may at least partially reside in a hoistway 22 provided vertically within a multi-story building 24. Some components of the elevator system may reside outside of the hoistway 22, for example in a machine room above the hoistway. Typically, the hoistway 22 may be a hollow shaft provided within a central portion of the building 24 with multiple hoistways being provided if the building is of sufficient size and includes multiple elevators. Extending substantially the length of the hoistway 22 may be rails 26 and 28. An elevator car 30 may be slidably mounted on a pair of rails 26 (for clarity, only one rail 26 is shown in FIG. 1) and a counterweight 32 may be slidably mounted on a pair of rails 28 (for clarity, only one rail 28 is shown in FIG. 1). While not depicted in detail in FIG. 1, one of ordinary skill in the art will understand that both the car 30 and counterweight 32 could include roller mounts 34, bearings, or the like for smooth motion along the rails 26 and 28. The roller mounts, bearings, or the like may also be slidably mounted to the rails 26 and 28 in a secure fashion.

In order to move the car 30 and, thus, the passengers and/or cargo loaded thereon, a machine (31) including an electric motor 36 may be provided typically at the top of hoistway 22 or in a machine room above the hoistway 22. Electrically coupled to the motor 36 may be an electronic controller 38 which in turn may be electrically coupled to a plurality of operator interfaces 40 provided on each floor to call the elevator car 30, as well as an operator interface 42 provided on each car 30 to allow the passengers thereof to dictate the direction of the car 30.

A safety chain circuit 54, as well as a power supply 56, may also be electrically coupled to the electronic controller 38. Mechanically extending from the motor 36 may be a drive shaft 44, which in turn may be operatively coupled to a traction sheave 46, and further may extend to operatively couple to a braking apparatus 52. The traction sheave 46 could in some instances be part of the drive shaft 44.

Trained around the sheave 46 may be a tension member 48, such as a round rope or a flat belt. The tension member 48 may be in turn operatively coupled to counterweight 32 and car 30 in any suitable roping arrangement. Of course, multiple different embodiments or arrangements of these components are possible with a typical system including multiple tension members 48 as well as various arrangements for the motor and the sheaves of the elevator system 20.

Figure 2:
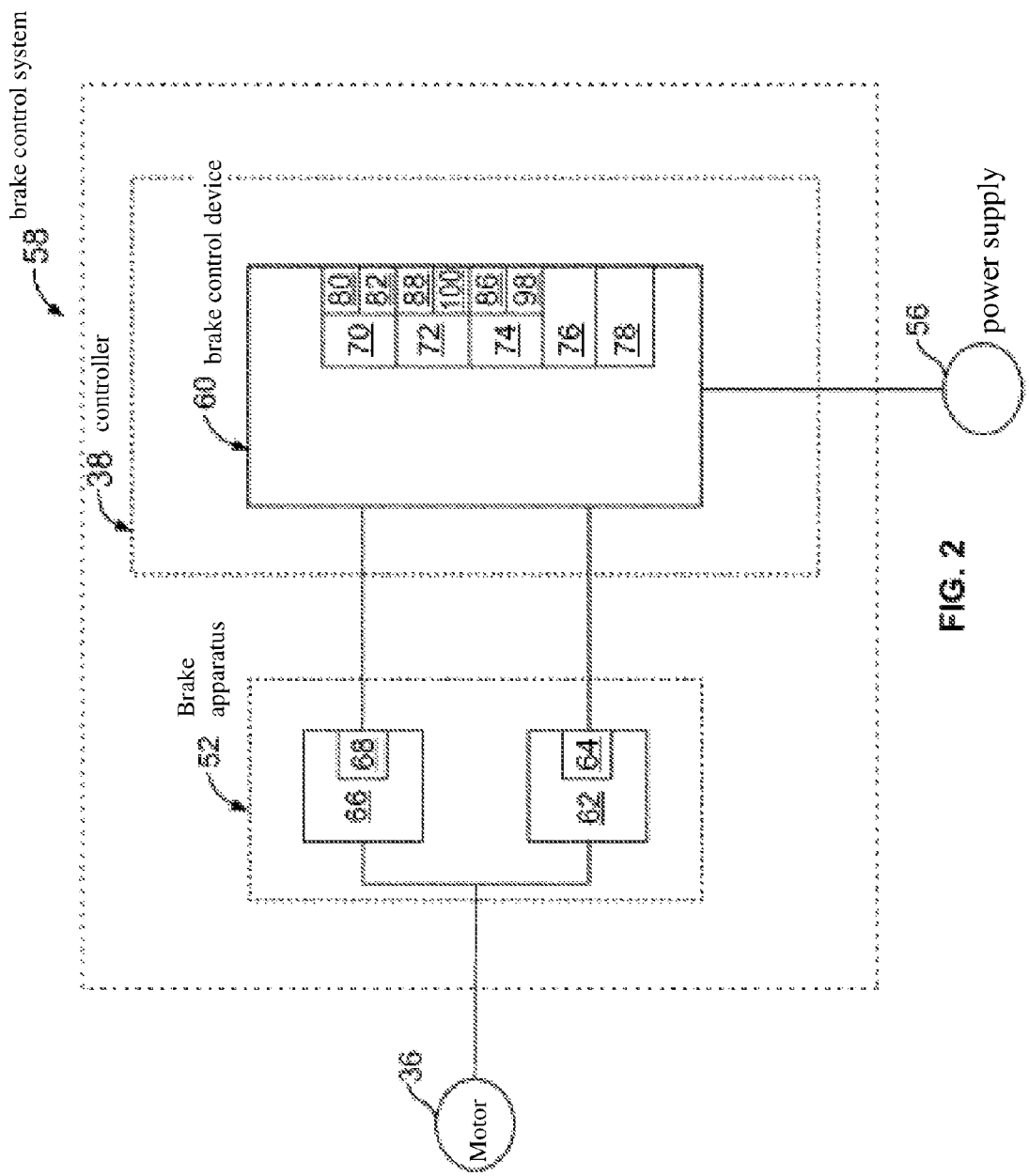
FIG. 2 is a schematic illustrating one embodiment of a brake control system in accordance with the teachings of this disclosure.

The elevator system 20 may also include a brake control system 58. In some embodiments, the machine 31 that is used to raise and lower the elevator car 30 may include the brake control system 58. As shown in FIG. 2, the brake control system 58 may be electrically coupled to the power supply 56 and mechanically coupled to the motor 36 for the elevator system 20. The brake control system 58 may comprise the brake apparatus 52 electrically coupled to a brake control device 60.

The brake apparatus 52 may include at least one brake. In an exemplary embodiment, the brake apparatus 52 could include a first brake, such as service brake 66, and a second brake, such as emergency brake 62. The first brake could be a discrete unit from the second brake, or the first brake and the second brake could be components of a single brake unit. The emergency brake 62 can have a magnetic emergency brake coil 64, and the service brake 66 can have a magnetic service brake coil 68. When energized, the brake coils 64, 68 cause the brakes 62, 66 to disengage such that no braking force is applied to slow or stop the elevator car 30. When the brake coils 64, 68 are not energized (or not sufficiently energized), the brakes 62, 66 are engaged and a braking force is applied to the elevator car (this may also be referred to as "dropping the brakes").

The brake control device 60 may be coupled to the brake coils 64, 68 of the brake apparatus 52 and may selectively control the decay of stored energy within one or both of the coils 64, 68 during certain operating conditions. In an embodiment, the brake control device 60 may be part of the electronic controller 38. In other embodiments, the brake control device 60 may be separate from the electronic controller 38 or incorporated into other components in the elevator system 20. In an embodiment, the brake control device 60 may control the decay of the stored energy within each of the brake coils 64, 68 so that one of the brakes 62, 66 may be engaged relatively quickly and the engagement of the other brake may be delayed by the natural decay of the stored energy within its associated brake coil. Sequencing the application of the emergency brake 62 and the service brake 66 can reduce the initial retarding force applied to the drive shaft 44 (FIG. 1) which results in a lower deceleration rate of the elevator car 30. The operating conditions of the elevator system during which selectively controlling the decay of stored energy within one or both of the coils may be used include, for example, loss of power, unintended car movement, ascending car overspeed, etc.

The brake control device 60 may comprise a brake pick 70 having a plurality of contacts, a Power Monitoring Relay 72 having a plurality of contacts, an Over Speed Relay 74 having a plurality of contacts, an Unintended Car Movement (UCM) Relay 76 and a Safety Chain Relay 78. The brake pick 70 serves to close switches 80 and 82 to energize the brake coils 64 and 68 at the beginning of an elevator run and open the switches 80 and 82 at the end of an elevator run. In an embodiment, the Power Monitoring Relay 72 may monitor alternating current (AC) power. In other embodiments, the Power Monitoring Relay 72 may monitor direct current (DC) power, or DC and AC power. As further discussed below, the brake control device 60 may also include a brake power source, a plurality of diodes and a plurality of snubbers. The snubbers may be used in the brake control device 60 discussed herein to prevent damage to brake control device elements when there is a sudden interruption of current.

Figure 3:
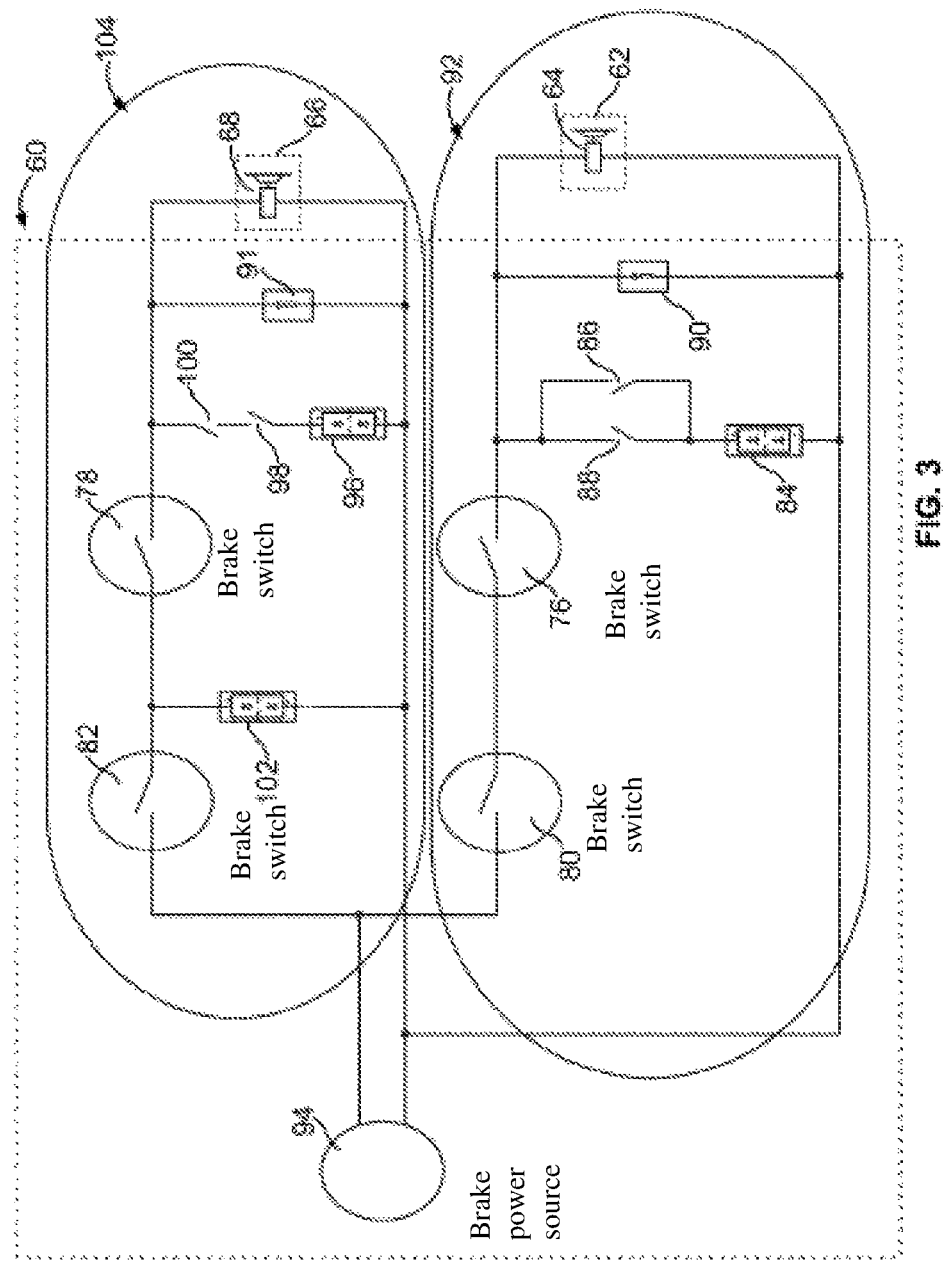
FIG. 3 is one embodiment of a brake control device for use in the brake control system of FIG. 2.

Turning now to FIG. 3, an exemplary brake control device 60 is disclosed. The brake control device 60 may be electrically connected to the emergency brake 62 through the emergency brake coil 64 and to the service brake 66 through the service brake coil 68. The first brake switch 80 may be connected to the UCM relay 76. As illustrated in FIG. 3, the brake control device 60 may include a first diode 84 that may be connected in parallel with the emergency brake coil 64 through a first contact 86 of the Over Speed Relay 74 and a primary contact 88 of the First Power Monitoring Relay 72. The Over Speed Relay 74 serves to open switch 86 during an overspeed event to disconnect the diode 84 to prevent current circulation in the emergency brake coil 64. A first snubber 90 may also be connected in parallel with the emergency brake coil 64. The UCM relay 76 may be connected to the emergency brake coil 64. The portion of the brake control device 60 described above and the emergency brake coil 64 may be referred to collectively as the "Emergency Brake Circuit" 92. In an embodiment, the Emergency Brake Circuit 92 may receive power from a brake power source 94 that may be part of the brake control device 60.

As further shown in FIG. 3, the second brake switch 82 may be connected to the Safety Chain relay 78. The Safety Chain relay 78 may be connected to the service brake coil 68. A second diode 96 may be connected in parallel with the service brake coil 68 through a second contact 98 of the Over Speed Relay 74 and a secondary contact 100 of the Power Monitoring Relay 72. A snubber 91 may also be connected in parallel with the service brake coil 68. A third diode 102 may be connected to the Safety Chain relay 78. The portion of the brake control device 60 described above and the service brake coil 68 may be referred to collectively as the "Service Brake Circuit" 104. The Service Brake Circuit 104 may receive power from the brake power source 94.

Figure 4:
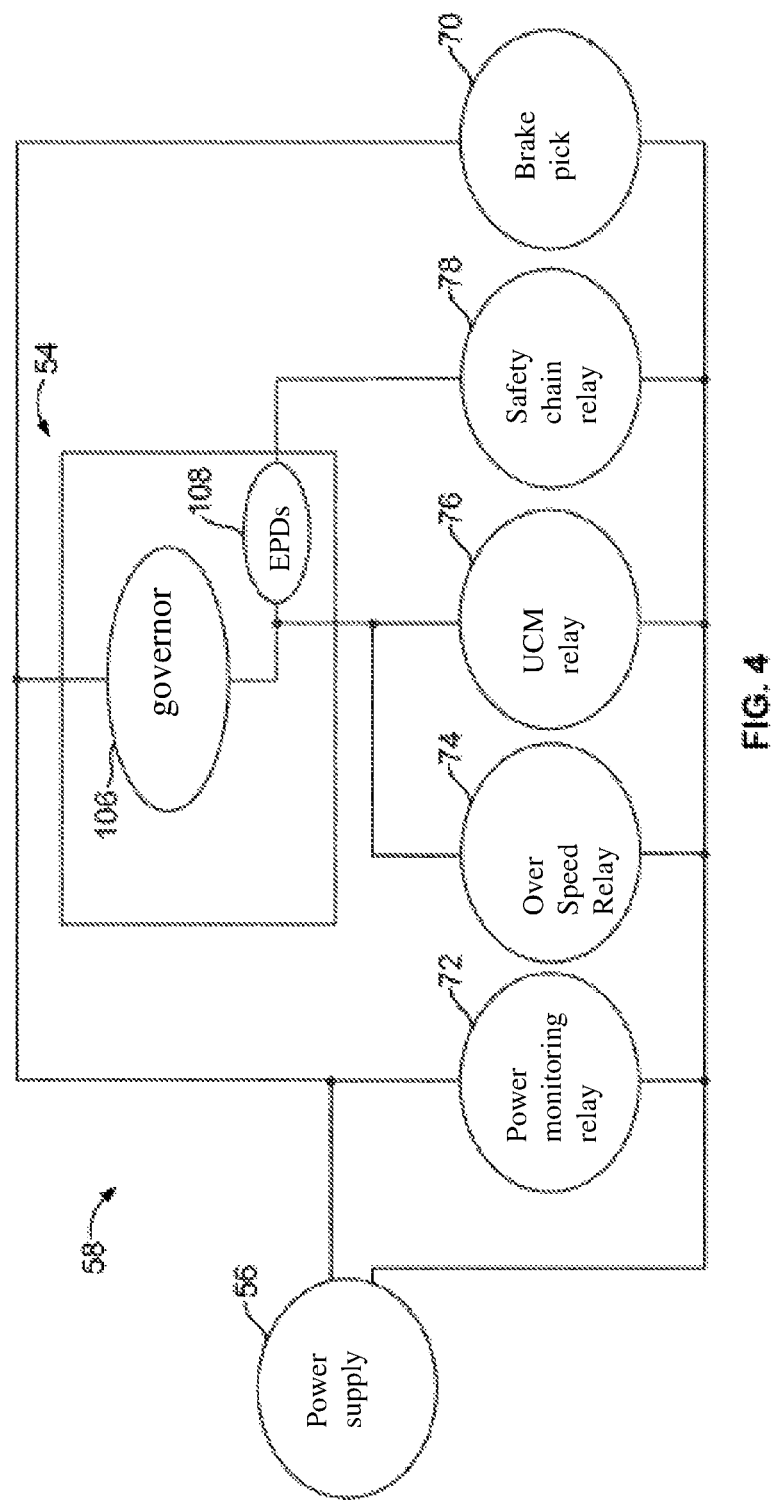
FIG. 4 is illustrates one embodiment of the interconnection of various electrical components of the brake control device of FIG. 3 with an elevator system.

As illustrated schematically in FIG. 4, the power supply 56 may energize the safety chain 54 and the Power Relay 72. It should be understood that the power supply 56 may energize other components within the elevator system 20 such as, but not limited to, the electronic controller 38 and the operator interfaces 40, 42. Furthermore, the power supply 56 may provide an AC power source and/or a DC power source, depending on the power needs of the components being energized. Moreover, the elevator system 20 may incorporate more than one power supply to energize the various components within the system 20. For example, in an embodiment a separate brake power source 94 may be utilized to provide power to the Emergency Brake Circuit 92 and the Service Brake Circuit 104.

The safety chain 54 may comprise a governor 106 and various Electrical Protective Devices (EPDs) 108 electrically connected together. The governor 106 monitors the speed of the car 30. In alternative embodiments, a device other than the governor 106 may monitor the speed, including the overspeed, of the car 30. The EPDs 108 may monitor the safety status of various elevator system 20 components. The governor 106 and the EPDs 108 may be connected together in a serial circuit. If the governor 106 or one of the EPDs 108 do not close (complete the circuit), then the safety chain 54 may be "open." Typically when the safety chain 54 is open, the elevator car 30 is brought to a stop or remains stopped. Such an open condition may be triggered by the governor 106 when the speed of the car 30 exceeds a threshold. The open condition may also be triggered when an unsafe condition is detected by an EPD 108. As shown in FIG. 4, the Over Speed Relay 74, the UCM Relay 76, and the Safety Chain Relay 78 may be electrically connected to the safety chain 54. In some embodiments, these elements may be part of the safety chain 54. In addition, the brake pick 70 may be energized by the power supply 56.

As shown in FIGS. 3-4, during normal operation of the elevator system 20 the first and second brake switches 80, 82 may be closed, the Safety Chain Relay 78 may be closed, the UCM Relay 76 may be closed, and both the Over Speed Relay 74 and the Power Monitoring Relay 72 may be energized. When energized, the first Over Speed Relay Contact 86 may be closed and the primary Power Monitoring Relay Contact 88 may be open in the Emergency Brake Circuit 92. In the Service Brake Circuit 104, the second Over Speed Relay Contact 98 may be open and the secondary Power Monitoring Relay Contact 100 may be closed. Because, in this embodiment, the second Over Speed Relay Contact 98 is open, the second diode 96 is substantially disconnected from the service brake coil 68.

When a signal is received to stop the elevator car 30 at a floor to pick-up or drop off passengers, the motor functions to stop the elevator. The service brake 66 and the emergency brake 62 may be applied to hold the elevator car 30 in place during the stop. As such, the first and second brake switches 80, 82 may be opened. However, in the embodiment shown in FIG. 3, some of the residual current flowing from the service brake coil 68 may continue to circulate through third diode 102 and the Safety Chain relay 78 back through the service brake coil 68. Some residual current from the emergency brake coil 64 may continue to circulate through the first diode 84, and the first Over Speed Relay Contact 86 back to the emergency brake coil 64. Because such circuits provide low impedance current paths for the residual current from the brake coils 64, 68, the currents flowing through the brake coils 64, 68 decay relatively slowly. This slow decay in both of the brake coils 64, 68 delays the application of both the service brake 66 and the emergency brake 62 when power is removed by the brake switches 80, 82. When the current dissipates beyond a threshold, it can no longer energize the coil and the respective brake will be engaged (be dropped). In an embodiment, the delay may be in the range of about 150 milliseconds to about 600 milliseconds.

Car overspeed in either direction, as is known in the art, occurs when the speed of a moving elevator car 30 exceeds a defined threshold. In the event of such overspeed, the governor 106 opens. In the embodiment illustrated in FIGS. 3-4, opening of the governor 106 breaks (opens) the safety chain 54 and causes each of the UCM relay 76, the Over Speed Relay 74, and the Safety Chain relay 78 to open. Even though the governor 106 is open, the Power Monitoring Relay 72 may remain energized.

During an overspeed event, both the first Over Speed Relay Contact 86 and the primary Power Monitoring Relay contact 88 may be open in the Emergency Brake Circuit 92. This may result in the first diode 84 being disconnected from the emergency brake coil 64. Consequently, the current in the emergency brake coil 64 dissipates relatively quickly and the emergency brake 62 is engaged as soon as the current becomes too weak to continue to energize the emergency brake coil 64.

In the embodiment shown in FIG. 3, opening the Safety Chain relay 78 disconnects the third diode 102 from the service brake coil 68. Because in the Service Brake Circuit 104 both the second Over Speed Relay Contact 98 and the secondary Power Monitoring Relay contact 100 are closed, the second diode 96 is connected in parallel to the service brake coil 68. Since this arrangement provides a low impedance circulating path for the residual current, some residual current from the service brake coil 68 may continue to circulate through the second diode 96, the second Over Speed Relay Contact 98 and the secondary Power Monitoring Relay contact 100 back to the service brake coil 68. This slows the decay of the current in the service brake coil 68, therefore delaying the application of the service brake 66. In an embodiment, the delay may be in the range of about 150 milliseconds to about 600 milliseconds. The service brake 66 is engaged as soon as the residual current becomes too weak to continue to energize the service brake coil 68 and the springs in the brakes overcome the force created by the energized coil and apply a braking force. In contrast, the emergency brake coil 64 residual current has no low impedance circulating path and decays rapidly, thus causing the emergency brake 62 to drop generally faster than the service brake.

Sometimes an elevator car 30 may experience during operation Unintended Car Movement (UCM), as is known in the art. An example of such a UCM event is when movement of the car (30) occurs while the car (30) resides at a landing and the doors are open or unlocked. In the event that UCM is sensed during operation, both the UCM relay 76 and the safety chain 54 open. In the embodiment shown in FIGS. 3-4, opening the safety chain 54 also opens the Safety Chain relay 78, thus disconnecting the third diode 102 from the service brake coil 68. As illustrated in FIGS. 3-4, both the Over Speed Relay 74 and the Power Monitoring Relay 72 are energized. When energized, the first Over Speed Relay Contact 86 may be closed and the primary Power Monitoring Relay Contact 88 may be open in the Emergency Brake Circuit 92. In the Service Brake Circuit 104, the second Over Speed Relay Contact 98 may be open and the secondary Power Monitoring Relay Contact 100 may be closed. Because the second Over Speed Relay Contact 98 is open, the second diode 96 is disconnected from the service brake coil 68. The first diode 84 is tied in parallel with the emergency brake coil 64 through the first Over Speed Relay Contact 86. Thus during an UCM event, because the residual service brake coil 68 current does not have a low impedance circulating path, the service brake 66 drops without delay. To the contrary, the application (or dropping) of the emergency brake 62 is delayed by the residual current recirculating through the emergency brake coil 64. As soon as the residual current becomes too weak to energize the emergency brake coil 64, the emergency brake 62 will be engaged. In an embodiment, the delay may be in the range of about 150 milliseconds to about 600 milliseconds.

In the event that power is lost to the elevator, as illustrated in FIGS. 3-4, both the Over Speed Relay 74 and the Power Monitoring Relay 72 may be de-energized as well as the UCM relay 76 and the Safety Chain relay 78. Under such a scenario, the first Over Speed Relay Contact 86 may be open and the primary Power Monitoring Relay Contact 88 may be closed in the Emergency Brake Circuit 92. In the Service Brake Circuit 104, the second Over Speed Relay Contact 98 may be closed and the secondary Power Monitoring Relay Contact 100 may be open.

In the embodiment of FIG. 3, the first diode 84 is tied in parallel with the emergency brake coil 64 through the primary Power Monitoring Relay Contact 88. On the other hand, the second diode 96 is substantially disconnected from the service brake coil 68 because the secondary Power Monitoring Relay Contact 100 is open. In addition, the third diode 102 is disconnected from the service brake coil 68 by the Safety Chain relay 78. Since, the service brake 66 current does not have a low impedance circulating path, the current in the service brake coil 68 will dissipate relatively quickly allowing the service brake 66 to be engaged relatively quickly. Application of the emergency brake 62 will be delayed by the recirculation of some of the residual emergency brake coil current through the primary Power Monitoring Relay Contact 88 back to the emergency brake coil 64. As soon as the residual current becomes too weak to energize the emergency brake coil 64, the emergency brake 62 will be engaged. In an embodiment, the delay may be in the range of about 150 milliseconds to about 600 milliseconds.

INDUSTRIAL APPLICABILITY

In light of the foregoing, it can be seen that the present disclosure sets forth an elevator with a novel braking system that minimizes discomfort to passengers when the elevator car is stopped by the brakes during an emergency stop or power loss event. Elevators are continually used to transport passengers from one level to the next, making frequent stops. The braking system of the disclosure minimizes discomfort for the passengers, even in the event of an emergency. Emergencies may occur when the elevator experiences a power loss or a malfunction such as an overspeed or UCM event. In the event of an emergency, the braking device may ensure that the elevator is brought to a smooth stop.

The elevator system may comprise a car, a safety chain including a governor switch movable between an open and a closed position, a first brake having a first magnetic brake coil, a second brake having a second magnetic brake coil, and a brake control device having a brake power source. The first brake may be movable between a disengaged and an engaged position. The second brake movable between a disengaged and an engaged position. The brake control device may be electrically connected to the first and second brakes and the governor switch, and may be configured to selectively delay the movement of the first and second brakes to the engaged position with residual current from the respective brake coils. Selectively sequenced delay of the engagement of the brakes may, at a minimum, soften the stop of the elevator car for the passengers.

While only certain embodiments have been set forth, alternatives and modifications will be apparent from the above description to those skilled in the art. These and other alternatives are considered equivalents and within the spirit and scope of this disclosure.

What is claimed is:

1. An elevator system comprising:
    a car;
    a first brake having a first magnetic brake coil, the first brake movable between a disengaged and an engaged position; and
    a brake control device having a brake power source, the brake control device electrically connected to the first brake and configured to selectively delay the movement of the first brake to the engaged position with a first residual current from the first magnetic brake coil;
    wherein the delay of the movement of the first brake to the engaged position is controlled by recirculating the first residual current through the first magnetic brake coil.

2. The elevator system of claim 1, wherein the first brake is configured to be moveable to the disengaged position upon the first brake coil being energized by the brake power source and is configured to be moveable to the engaged position upon the first brake coil being de-energized.

3. The elevator system of claim 1, further comprising a second brake having a second magnetic brake coil the second brake electrically connected to the brake control device, the second brake movable from an engaged position to a disengaged position upon the second magnetic brake coil being energized by the brake power source and moveable to the engaged position upon the second magnetic brake coil being de-energized.

4. The elevator system of claim 3, wherein the brake control device is further configured to selectively delay the movement of the second brake to the engaged position by recirculating a second residual current from the second magnetic brake coil through the second magnetic brake coil.

5. The elevator system of claim 4 further comprising a safety chain electrically connected to the brake control device, the safety chain including a governor switch movable between an open and a closed position.

6. The elevator apparatus of claim 5, wherein movement of the second brake to the engaged position is delayed in response to the governor switch transitioning to the open position.

7. The elevator system of claim 1, further comprising a safety chain electrically connected to the brake control device, the safety chain including a governor switch movable between an open and a closed position and an elevator power source connected to the safety chain, wherein movement of the first brake is delayed in response to a loss of power from the elevator power source to the safety chain.

8. The elevator system of claim 1, wherein the first residual current delays the movement of the first brake to the engaged position by slowing the rate of decay of stored energy within the first magnetic brake coil.

9. The elevator system of claim 8, wherein the delay is in the range of about 150 to about 600 milliseconds.

10. The elevator system of claim 8, wherein movement of the first brake to the engaged position is delayed in response to unintended car movement (UCM) of the car.

11. The elevator system of claim 1, wherein the first brake is part of a machine used to raise and lower the car.

12. A brake system comprising:
    a first brake having a first magnetic brake coil, the first brake movable between a disengaged and an engaged position; and
    a brake control device for selectively delaying the movement of the first brake to the engaged position with residual current from the first magnetic brake coil, the brake control device electrically connected to the first brake;
    wherein the delay of the movement of the first brake to the engaged position is controlled by recirculating the residual current through the first magnetic brake coil.

13. The brake system according to claim 12, wherein the brake control device delays movement of the first brake in response to an unintended car movement (UCM) event.

14. The brake system according to claim 12 further comprising a second brake electrically connected to the brake control device, the second brake having a second magnetic brake coil and configured to be movable between a disengaged and an engaged position, wherein the brake control device selectively delays the movement of the second brake to the engaged position by recirculating a second residual current from the second magnetic brake coil through the second magnetic brake coil.

15. The brake system according to claim 14, wherein the brake control device delays movement of the second brake in response to an overspeed event.

16. The brake system according to claim 12, wherein the brake system is electrically connected to an elevator power source and the brake control device delays movement of the first brake in response to a loss of power from the elevator power source.

17. The brake system according to claim 12, wherein the delay is in the range of about 150 to about 600 milliseconds.

18. A method of retrofitting an elevator system having a car, a first brake having a first magnetic brake coil and a brake control device the method comprising:
    modifying the brake control device to selectively delay the activation of the first brake by controlling the rate of decay of stored energy within the first magnetic brake coil;
    wherein the rate of decay of stored energy within the first magnetic brake coil is controlled by recirculating a first magnetic brake coil residual current through the first magnetic brake coil.

19. The method according to claim 18, wherein the delay is in the range of about 150 to about 600 milliseconds.

20. The method according to claim 18 further comprising modifying the brake control device to selectively delay the activation of a second brake by controlling the rate of decay of stored energy within a second magnetic brake coil, wherein the elevator system further includes the second brake having the second magnetic brake coil.

21. The method according to claim 20, wherein the rate of decay of stored energy within the second magnetic brake coil is controlled by recirculating a second magnetic brake coil residual current through the second magnetic brake coil.

22. The method according to claim 21, wherein the elevator system further includes a safety chain having a governor switch movable between a closed position and an open position.

23. The method according to claim 22, wherein the first brake is activated before the second brake when the car experiences an unintended car movement (UCM) event and the second brake is activated before the first brake when the governor switch transitions to the open position.

* * * * *